May 29, 1928.
H. T. HOAG
1,671,367
AUTOMOBILE LUGGAGE CARRIER
Filed May 13, 1926
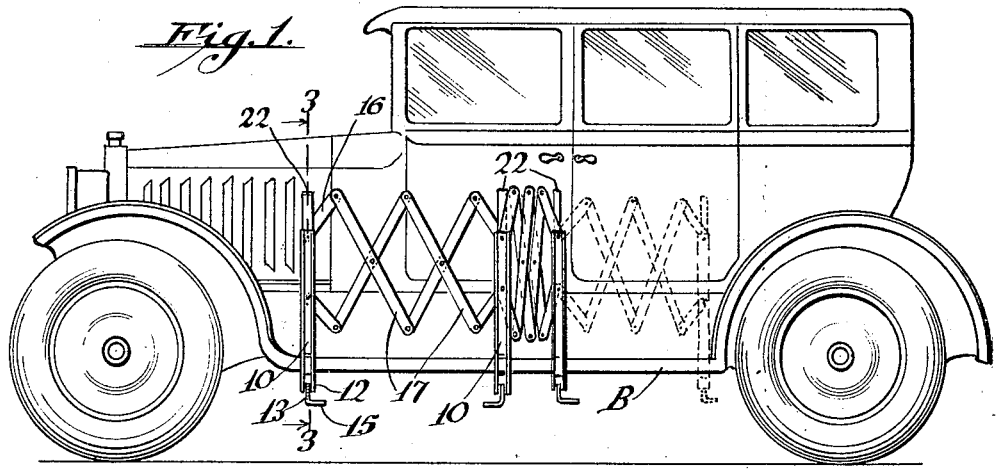
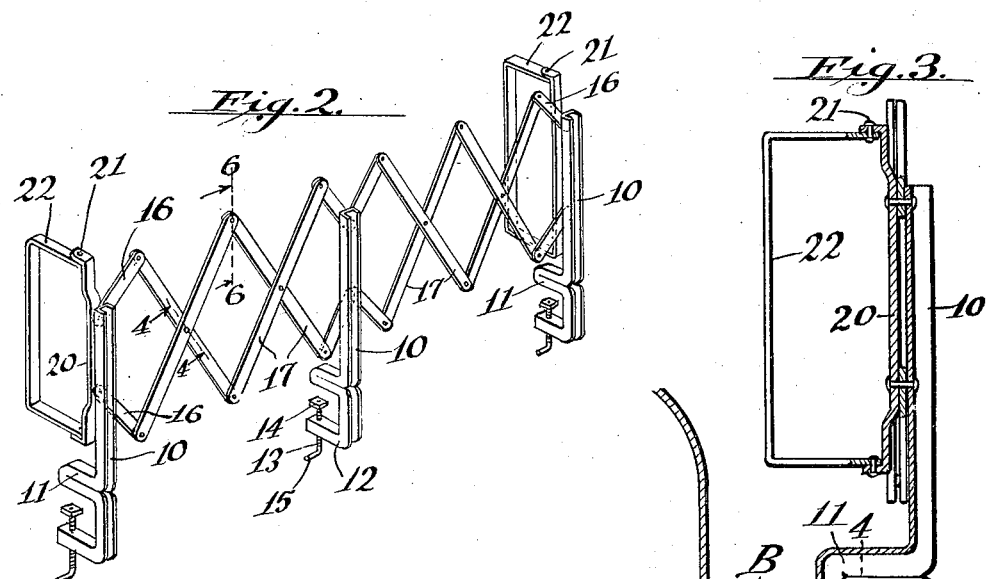

Patented May 29, 1928.

1,671,367

UNITED STATES PATENT OFFICE.

HARRY T. HOAG, OF LOS ANGELES, CALIFORNIA, ASSIGNOR TO AUTO SHEET METAL WORKS, OF LOS ANGELES, CALIFORNIA, A CORPORATION.

AUTOMOBILE LUGGAGE CARRIER.

Application filed May 13, 1926. Serial No. 108,740.

My invention relates to a luggage carrier of the type that is designed to be detachably applied to the running boards of automobiles and the principal objects of my invention are to generally improve upon and simplify the construction of the existing forms of automobile running board luggage carriers; to provide a device of the character referred to that is inexpensive of manufacture, strong and substantial in structure, capable of being easily and quickly applied to or removed from the running board of an automobile and which may be readily adjusted in length so as to occupy or enclose approximately half the length of the running board, thereby leaving the other half of the running board clear or unobstructed so as to enable the corresponding door of the vehicle to be opened for the entrance or exit of passengers.

A further object of my invention is to provide an improved form of standard that is utilized as a support for the extensible frame of the luggage carrier.

With the foregoing and other objects in view, my invention consists in certain novel features of construction and arrangement of parts that will hereinafter be more fully described and claimed and illustrated in the accompanying drawing, in which—

Fig. 1 is a side elevational view of an automobile and showing my improved luggage carrier applied to the running board thereof.

Fig. 2 is a perspective view of a luggage carrier embodying the principles of my invention.

Fig. 3 is an enlarged vertical section taken approximately on the line 3—3 of Fig. 1.

Fig. 4 is an enlarged cross section taken on the line 4—4 of Fig. 3.

Fig. 5 is a sectional view showing the ends of a pair of bars that are used in the lazy tongs structure that forms a part of the invention.

Fig. 6 is an enlarged detail section taken on the line 6—6 of Fig. 2.

Referring by numerals to the accompanying drawings which illustrate a practical embodiment of my invention, 10 10 designate standards that are detachably applied to the outer edge of the running board B of an automobile and which standards provide a firm and substantial support for the extensible body of the luggage carrier. Each standard is formed from a single piece of material, preferably a section of channel iron, a portion of which is bent double so as to provide near the lower end of the standard a short horizontally disposed arm 11, the under face of which is adapted to rest directly on top of the running board B and that portion of the section of channel iron below this arm 11 is extended downward a short distance and thence laterally in a plane below and parallel with the arm 11, thus forming a substantial L-shaped bracket 12 at the lower end of the standard and the lower portion of which bracket is designed to ocupy a position beneath the edge of the running board to which the carrier is applied.

That portion of the channel iron that forms the horizontally disposed arm 11 is bent so that the flanges on the upper half of the bent portion project downwardly while the flanges on the lower half of said portion project upwardly and thus said arm is practically tubular in form and as it is of double thickness, it provides a very strong and substantial foot or base for the standard when the same is applied to the running board.

Screw-seated in the horizontally disposed portion of bracket 12 is a clamping screw 13, the upper end of which carries a head 14 that is adapted to bear against the underside of the running board and the lower portion of said clamping screw is bent laterally or at right angles to the body portion of the screw to form a handle 15 by means of which the screw may be readily rotated.

In the construction of my improved luggage carrier, I make use of three of the standards 10, two of said standards being arranged at the ends of the carrier and the third standard serving as an intermediate support.

Pivotally connected to the upper portions of the standards 10 are the ends of relatively short links 16 and pivotally connected to the ends of these links are longer links 17, which latter are pivotally connected to each other at their ends and centers to provide the well known lazy tongs' structure which may be extended or contracted lengthwise according to the position of the supporting members 10 on the running board.

I prefer to utilize rivets as the means for pivoting the links 16 and 17 to each other and to the standards 10, and when the apertures for the reception of the rivets are punched in said links, the latter are positioned on the punch press so that burrs 18 will be formed around said apertures on one face of each link and thus when the links are properly assembled with the burred edges in contact with each other, as illustrated in Fig. 5, said burrs will be forced inwardly toward each other and toward the shanks of the rivets 19 when pressure is applied to the latter for the purpose of setting the same (see Fig. 6).

Thus the burrs 18 that are formed on the links at the time the apertures are formed therein are utilized for clamping the rivets that pivotally connect said links and at the same time the links are spaced a slight distance apart so as to minimize friction and prevent the rubbing off of the paint or enamel at points adjacent to the rivets 19.

Secured to the inner faces of the standards 10 at the ends of the luggage carrier are upright straps 20, the ends of which are bent outwardly into horizontal planes to form ears 21 and pivotally connected to said ears are substantially C-shaped end frames 22 that are adapted to occupy vertical transverse planes over the running board to which the luggage carrier is applied and thus function as end panels or walls.

When my improved luggage carrier is applied to an automobile running board, the arms 11 of the standards 10 are arranged on top of the edge of the running board and by manipulation of the clamping screws 13, the heads 14 on the upper ends of said screws are engaged against the underside of the running board until the standards are very securely clamped thereto. The end frames 22 are now swung into transverse positions and thus the space between said end frames and the lazy tongs' structure may be utilized for the reception of luggage or other objects that may be conveniently carried on the running board.

Obviously the standards 10 may be arranged so that the carrier extends the full length of the running board or either end portion of the carrier may be collapsed against the intermediate standard as illustrated by solid lines in Fig. 1, and when such arrangement is carried out, the corresponding door of the vehicle may be readily opened to its full extent in order that persons may conveniently enter or alight from the vehicle.

A luggage carrier of my improved construction is comparatively simple, may be easily and quickly applied to or removed from an automobile running board, is readily adjusted lengthwise so that it may extend the entire length of the running board or only a part of the length thereof, may be collapsed and folded so as to occupy comparatively little space when packed for storage or transportation, and is very strong and substantial owing to the integral structure of its upright supporting members.

It will be understood that minor changes in the size, form and construction of the various parts of my improved automobile luggage carrier may be made and substituted for those herein shown and described without departing from the spirit of my invention, the scope of which is set forth in the appended claims.

I claim as my invention:

1. In an automobile luggage carrier, a retaining member of lazy tongs' structure and a plurality of supporting standards for said lazy tongs' structure, each standard being formed from a single piece of material having portions of its body at one end bent at right angles to provide a pair of horizontally disposed parallel arms that are adapted to overlie and underlie the running board to which the carrier is applied and the upper one of which arms is tubular in cross section and substantially twice the thickness of the lower arm.

2. In an automobile luggage carrier, a retaining member of lazy tongs' structure, a plurality of supporting standards for said lazy tongs' structure, each standard being formed from a single piece of material having portions of its body at one end bent at right angles to provide a pair of horizontally disposed parallel arms that are adapted to overlie and underlie the running board to which the carrier is applied, the upper one of which arms is tubular in cross section and substantially twice the thickness of the lower arm, and a running board clamping screw carried by the lower one of said arms.

3. In a luggage carrier, an extensible wall supporting member formed from a single piece of channel iron having a portion bent double to provide a substantially tubular arm that is disposed at right angles to the main body portion of the supporting member and the terminal portion of which section of channel iron being bent at right angles to the plane occupied by the upright portion of the supporting member so as to occupy a plane below and parallel with the plane occupied by said tubular arm.

4. In an automobile luggage carrier, a retaining wall of lazy tongs' structure, end frames pivotally connected to the end portions of said lazy tongs' structure, supporting standards secured to the ends of said lazy tongs' structure, a third supporting standard secured to the intermediate portion of the lazy tongs' structure, each standard being formed from a single section of channel iron, portions of the lower part of each section of channel iron being bent to form a pair of horizontally disposed parallel arms that are adapted to receive the edge of the running board to which the carrier is applied, the upper one of which arms is tubular in cross section and substantially twice the thickness of the lower arm, and a clamping screw seated in the lowermost one of said arms.

In testimony whereof I affix my signature.

HARRY T. HOAG.